United States Patent [19]

Aarseth

[11] Patent Number: 4,789,864

[45] Date of Patent: Dec. 6, 1988

[54] LOW ELEVATION GUIDANCE SYSTEM

[75] Inventor: Craig T. Aarseth, Massapequa, N.Y.

[73] Assignee: Eaton Corporation, Cleveland, Ohio

[21] Appl. No.: 41,166

[22] Filed: Apr. 22, 1987

[51] Int. Cl.$^4$ ................................................ G01S 1/16
[52] U.S. Cl. ...................................... 342/408; 342/390; 342/407
[58] Field of Search .......................... 342/390, 407, 408

[56] References Cited
U.S. PATENT DOCUMENTS

| | | | |
|---|---|---|---|
| 3,900,877 | 8/1975 | Kohler | 343/390 |
| 3,921,076 | 11/1975 | Currie | 343/390 |
| 4,193,075 | 3/1980 | Blazek et al. | 343/408 |
| 4,224,623 | 9/1980 | Mercer et al. | 343/390 |

Primary Examiner—Theodore M. Blum
Assistant Examiner—David Cain
Attorney, Agent, or Firm—C. H. Grace

[57] ABSTRACT

A guidance system for aircraft wherein a radio antenna on the ground transmits a beam that sweeps across an aircraft and the aircraft receives the beam and utilizes its amplitude waveform in determining the location of the aircraft from the station. At low elevation angles of the aircraft the portion of received waveform that includes significant amounts of signal reflected from the ground is used in only a preliminary manner. The more reliable, directly radiated, portions of the waveform are utilized to compute by least squares error, the median of a Gaussian beam shape. That median serves as an estimate of the time that the transmitting antenna was pointing directly at the aircraft.

6 Claims, 3 Drawing Sheets

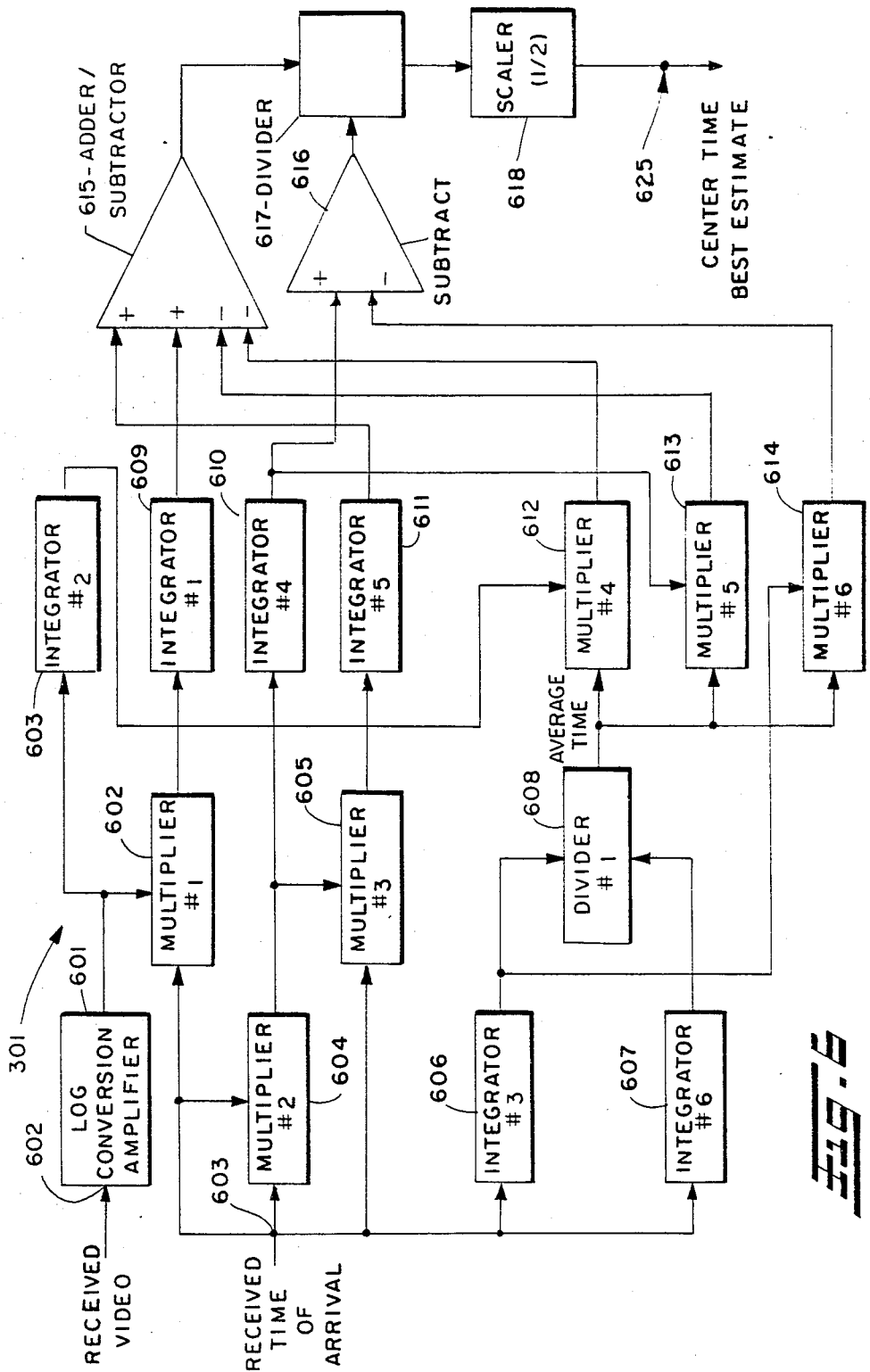

LOW ELEVATION GUIDANCE SYSTEM

FIELD

This invention relates to aircraft guidance systems such as landing systems, and particularly to those utilizing scanning radio beams transmitted from the ground to the aircraft and requiring accuracy at low elevation angles.

SUMMARY

The objects of the present invention are to provide a guidance system wherein an antenna beam transmitted from a ground-based station sweeps across an aircraft that receives the beam signal and utilizes the amplitude of the signal in determination of the direction of the aircraft from the station, for example, the angular elevation.

An object is to compute the direction of the aircraft from the transmitting antenna on the basis that the directly transmitted component of signals received at the aircraft (excluding the components of received signal reflected from the ground), has a generally Gaussian shape of radiation pattern.

An object is to utilize the reliable amplitude data, and to discriminate against amplitude data that is transmitted while the antenna's direction of pointing is so low that it is excessively corrupted by radio reflections from the ground, in computing an estimate of the boresight pointing angle of the ground-based transmitting antenna at the time that it is pointed directly at the elevation of the aircraft.

BRIEF DESCRIPTION OF THE DRAWINGS

FIG. 6 is a block diagram of a preferred embodiment of the beam fit decoder portion of FIG. 3.

PRIOR ART

Figure 1:
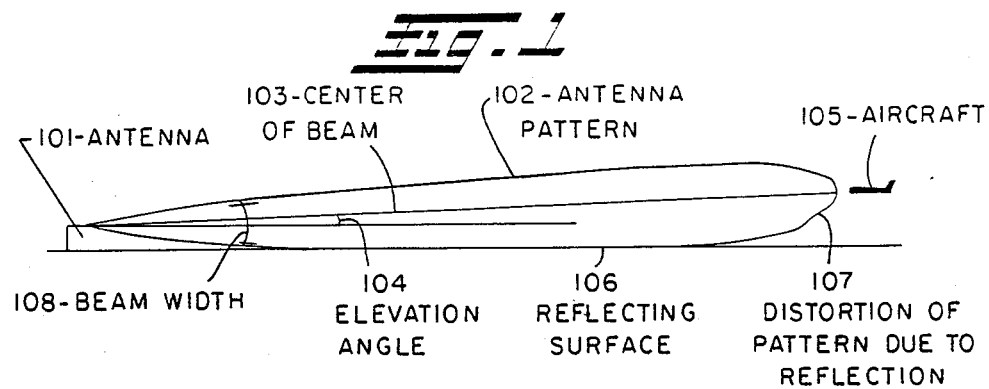
FIG. 1 is a side elevation view of an aircraft being guided by a ground-based station by means of a vertically sweeping radio beam.

A typical aircraft guidance system includes a transmitter on the ground and a receiver in the aircraft. The transmitter radiates a signal from a vertically scanning fan beam antenna whose antenna radiation pattern is often only a few degrees in elevation, as shown in FIG. 1. Antenna 101 radiates the beam, whose received pattern 102 has a centerline 103, which is inclined upward from the horizontal by an elevation angle, as shown at 104. The beam scans vertically across an aircraft 105. The width between 3 dB points of the pattern 102 is illustrated by reference numeral 108. When the elevation angle is as low as that illustrated, a portion of the energy radiated from the antenna impinges upon the earth, which acts as a reflecting surface 106, and a portion of that energy is reflected upward toward the aircraft 105. At the aircraft the direct signal and the reflected signal combine with uncontrolled phase relationship and produce a distortion 107 of the beam, which would otherwise be relatively symmetrical about its centerline 103.

The actual elevation angle of the transmitting antenna is continually measured at the station and that information is encoded for transmission on the radio beam to the aircraft. The beam signal may comprise a series of pulse pairs, with the antenna elevation angle information encoded in the signal by adjustment of the time between each pair of pulses and the next pair.

Figure 2:
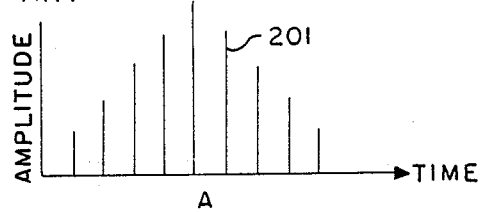
FIGS. 2A and 2B show elevation-encoded signals received by the aircraft in one type of guidance system.
Figure 2:
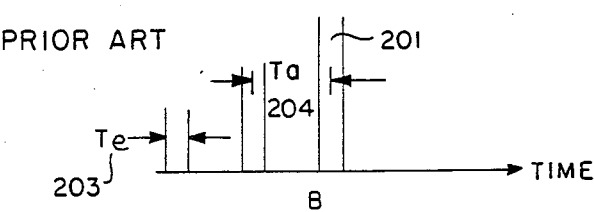

FIG. 2-A shows the signal received by the aircraft. As the scanning beam traverses the aircraft vertically the amplitudes of the pulse signals increase to a maximum and then decrease, and the envelope of the amplitudes of the pulse pairs is generally the shape of a rectilinear graph of the beam pattern 102. In FIG. 2-A each of the lines 201 represents a pair of pulses, as shown in magnified form in FIG. 2-B. Typically, the aircraft may receive 75 such pulse pairs during one traversal of the aircraft by the vertically scanning fan beam, but fewer pairs are illustrated for drafting convenience. In FIG. 2-B the time interval 203 between the pulses of one of the pulse pairs 201 is illustrated as $T_e$. $T_e$ is typically 12 microseconds, and that time interval identifies the signal as being the elevation guidance signal. The time between pairs, $T_a$, shown as 204, is modulated to convey information to the aircraft as to the instantaneous boresight elevation of the transmitting antenna 101.

The receiving system in the aircraft ascertains the elevation angle of the aircraft by first determining when the boresight center of the beam passed the aircraft, then decoding the elevation value that the encoded elevation angle data had at that time. A simple but sometimes inaccurate way of estimating that center time is by halving the time that the beam signal exceeds a threshold such as a 3 dB points. This results in inaccuracy when the received beam pattern is distorted by ground reflections at low elevation angles.

Details of a prior art system are in U.S. Pat. No. 4,193,075, Mar. 11, 1980, Blazek and Charych, which has an ideal pattern generator 105. An ideal pattern is generated also in the present invention, wherein the ideal pattern is a Gaussian one, which is especially amenable to convenient calculations, and those calculations are specified.

DETAILED DESCRIPTION

Figure 3:
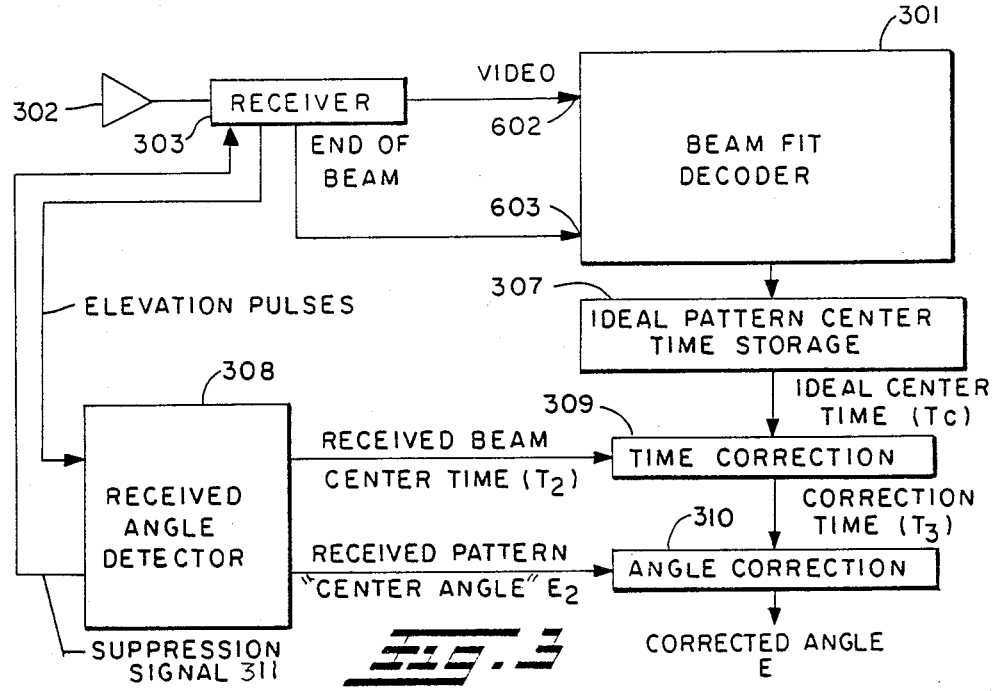
FIG. 3 is a block diagram of the airborne portion of an aircraft guidance system.

The preferred embodiment of the invention involves principally the airborne equipment, FIG. 3, and in particular one of its components called the beam fit decoder 301, whose details are shown in FIG. 6. The system of FIG. 3 comprises in addition to the beam fit decoder 301 a receiving antenna 302; a receiver 303 to which the antenna is connected; a received angle detector 308, which decodes the elevation angle signal being transmitted by the antenna; a time correction circuit 309; and an elevation angle correction circuit 310.

In the operation of the system a received beam signal at the antenna 302 is detected in the receiver 303 and the detected video signal from the receiver is connected to a terminal 602 of the beam fit decoder 301. The receiver 303 has a threshold circuit that is well known in the prior art for indicating when the envelope of the received signal increases above a threshold on its leading edge and when it decreases below the threshold on its trailing edge, the latter indication being called the "end of beam signal." The end of beam signal from the receiver 303 is connected to a terminal 603 of the beam fit decoder 301, as shown in FIG. 3. The beam fit decoder analyzes the received video signal in a manner described below and outputs an estimate of the boresight time or ideal center time $T_c$ of the signal to a storage unit 307.

The purpose of the portions of the system other than 301 is to determine the correct elevation angle E from the time $T_c$. The initial step in determining E is to supply the information from the receiver 303 to the received angle detector 308. In the detector 308 the apparent time $T_2$ of occurrence of the center of the received beam is determined, (based on the average of the times of receiving the 3 dB points of the received envelope), and fed to a time correction unit 309. The time $T_2$ can be an inaccurate estimate of the boresight time, to the extent that the beam pattern is distorted, as shown in FIG. 1. The time correction unit 309 also receives the time estimate $T_c$ from the storage unit 307 and subtracts $T_c$ from $T_2$ to obtain a time error or correction time $T_3$.

The elevation angle $E_2$ corresponding to the center of the received distorted beam 102 is determined in 308, and the angle $E_2$ is fed to the angle correction unit 310. The unit 310 also receives the correction time signal $T_3$ from the correction unit 309 and applies it to correct the angle $E_2$ and produce a corrected elevation angle E. All of the functions described above may be performed by well known circuitry, such as the circuits described in U.S. Pat. No. 4,193,075.

Figure 4:
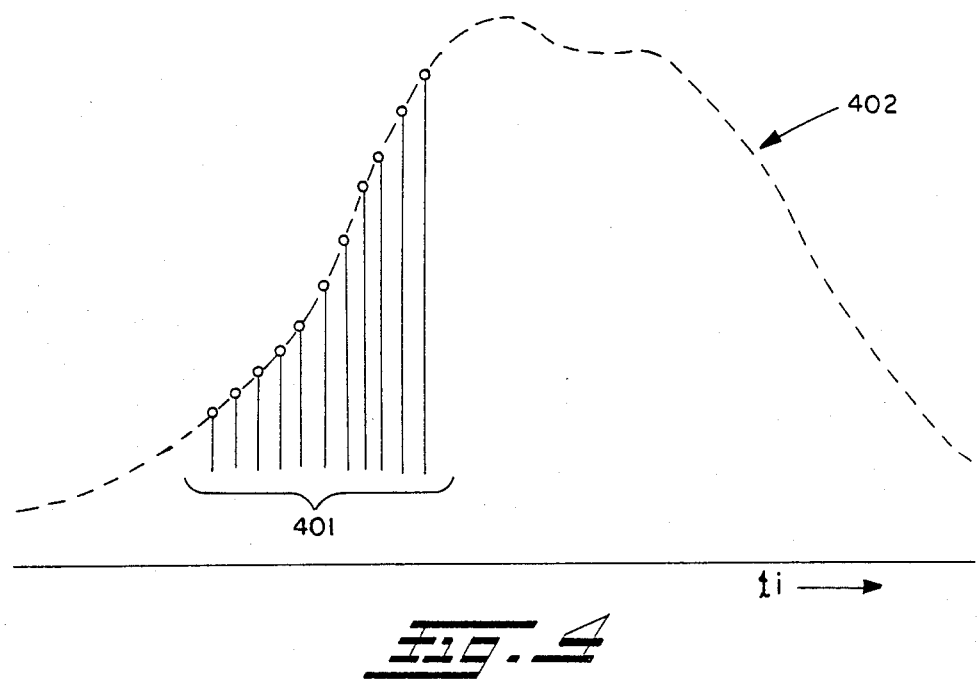
FIG. 4 shows a truncated set of data received by an aircraft at a low elevation angle and a received beam pattern curve that produced it.

The envelope of the signals received by the aircraft at a low elevation angle is shown as curve 402 of FIG. 4. The curve of FIG. 4 corresponds to a downwardly sweeping fan beam. The beam fit decoder 301 receives a series of the pulse pairs 201 of varying amplitude, a reduced number of which are symbolized by the data points 401 of FIG. 4. In this example 16 data points, corresponding to 16 pairs of pulses identified by an index i, are assumed to be sent to the beam fit decoder 301. Their times of occurrence are $t_i$ and their amplitudes are $y_i$. Those transmitted earlier than the group 401 were below an amplitude threshold and those occurring after the group 401 corresponded to encoded elevation data below a predetermined lower elevation limit. Data transmitted when the scanning antenna is below that elevation limit is regarded as unreliable by the receiving system. A suppression signal 311 from 308 to 303 (FIG. 3) blocks the data below a predetermined elevation from reaching the decoder 301. Decoder 301 analyzes the 16 data points 401 and estimates the boresight elevation angle of the transmitting antenna in a manner described in detail below.

Figure 5:
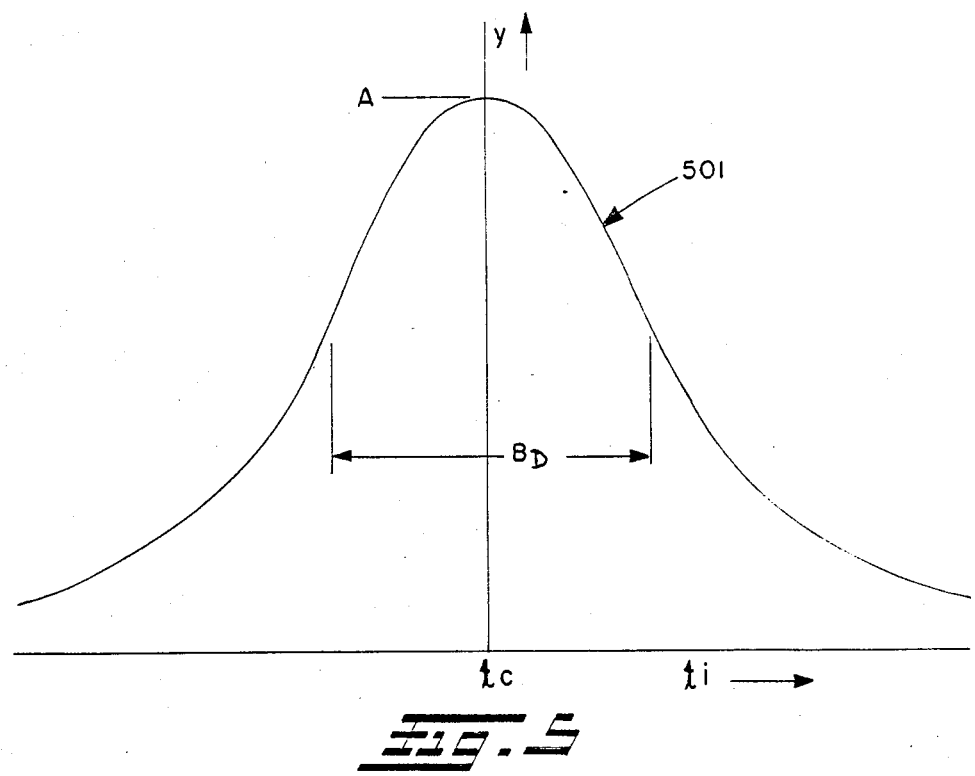
FIG. 5 is a typical Gaussian distribution curve, some of whose parameters were calculated from the data of FIG. 4.

Most antennas of the type employed in guidance systems have free space beam radiation patterns shaped like the curve 501 of FIG. 5. An almost identical shape of curve is frequently encountered where statistical analysis has a part in physical theory or in accidental errors of measurement, where it arises as a frequency distribution or an error distribution function. It is a "normal distribution" or "Gaussian distribution", whose mathematical form may be written as follows:

$$y_i = A \exp - K \left( \frac{t_i - t_c}{B_D} \right)^2 \quad \text{Equation 1}$$

Where:

$y_i$ is the amplitude at a time $t_i$; the peak amplitude is A; the center of symmetry of the curve occurs at an abscissa $t_c$; K is a proportionality constant and $B_D$ is the width of the curve between the two points at which the ordinate is 0.707 × A.

The beam fit decoder 301 employs an assumption that a least squares error fit of a Gaussian curve such as 501 to the partial and uncorrupted data 401 defines the direct beam's shape, without the effects of ground reflections. After the parameters of a Gaussian curve 501 are automatically selected to fit the data 401, an estimate of the time $t_c$ of occurrence of the center of the curve 501 is outputted, to serve as an estimate of the boresight elevation angle of the ground-based antenna 101.

Applying the Gaussian nomenclature to the guidance system, each of the times $t_i$ of FIG. 4 represents the time of occurrence of the middle of a pulse pair of the group 401 of sixteen pairs. $y_i$ represents the amplitude of each pulse pair 401. $B_D$ represents the dwell time (seconds) that the beam would have on the aircraft antenna between 3 dB points of the beam if no ground distortion of the beam pattern were occurring. $B_D$ is therefore equal to the undistorted beam width in degrees divided by the scanning speed of the antenna in degrees per second.

Using the curve parameters thus obtained, one can derive a mathematical expression for a statistical estimate $T_c$ of the actual central time $t_c$ by the following plan:

Take the natural logarithm of both sides of Equation 1 to simplify the computations.

Write an expression for the summation over all readings of the squares of the errors between the data and the Gaussian curve 501, where the curve is expressed in terms of the central time $t_c$ and the amplitude A, whose values are being sought.

Differentiate the expression for that summation and set the derivatives equal to zero.

Consolidate the results and solve for the estimate $T_c$ of the time $t_c$.

The computation is shown in abbreviated form as Equaations 2 through 11 below.

Change of variable:

$$z_i = \ln (y_i) / \frac{K}{B_D^2} \quad \text{Equation 2}$$

$$P = \ln (A) / \frac{K}{B_D^2} \quad \text{Equation 3}$$

so $$z_i = P - (t_i^2 - 2t_i t_c + t_c^2) \quad \text{Equation 4}$$

For "Amplitude Variance" we seek estimates $\hat{c}$ and $\hat{P}$ such that Q is a minimum, $$\text{where } Q = \sum_1^n (y_i - \hat{y}_i)^2 = \text{minimum} \quad \text{Equation 5}$$

$$\text{or } Q = \sum_{i=1}^n (z_i - \hat{P} + (t_i - \hat{t}_c)^2)^2 = \text{minimum} \quad \text{Equation 6}$$

At the minimum the relevant derivatives are zero.

$$\frac{\partial Q}{\partial P} = 0 \quad \text{Equation 7}$$

Solving for $P_c$:

$$\hat{P} = \frac{1}{n}\Sigma z_i + \frac{1}{n}\Sigma(t_i^2) - \frac{2\hat{t}_c}{n}\Sigma t_i + \hat{t}_c^2 \quad \text{Equation 8}$$

$$\frac{\partial Q}{\partial \hat{t}_c} = 0 \quad \text{Equation 9}$$

$$\frac{\partial Q}{\partial \hat{t}_c} = \Sigma(z_i t_i) - \hat{t}_c\Sigma(z_i) - \hat{P}\Sigma(t_i) + 3\hat{t}_c^2\Sigma(t_i) - \quad \text{Equation 10}$$

$$3\hat{t}_c\Sigma(t_i^2) + \Sigma(t_i^3) - n\hat{t}_c^3 + n\hat{t}_c\hat{P}$$

Substitution of result for from Equation 8, cancellation of terms, and consolidation yields:

$$\hat{t}_c = \frac{\Sigma(z_i t_i) - \frac{1}{n}[(\Sigma z_i)(\Sigma(t_i)) + \Sigma(t_i^2)\Sigma(t_i)] + \Sigma(t_i^3)}{2\Sigma(t_i^2) - \frac{2}{n}(\Sigma t_i)^2} \quad \text{Equation 11}$$

An analog embodiment of the beam fit decoder 301 is shown in FIG. 6. A linear video signal enters a logarithmic conversion amplifier 601 at its input terminal 602. A timing pulse indicating the time of occurrence of each pulse pair of that video signal comes from the receiver 303 to a time of arrival terminal 603. The output of the beam fit decoder 301 is shown at the right side of FIG. 6 at a terminal 625. The output is a best estimate $T_c$ of the time at which the true boresight center of the scanning fan beam from antenna 101 is at the elevation of the aircraft's receiving antenna 302.

Each of the modules of FIG. 6 is well known individually in the prior art (see U.S. Pat. No. 4,193,075). They are arranged to perform the computation of Equation 11. The order in which the functions of FIG. 6 are described below is: (a) terms that enter into the adder/subtracter 615; (b) terms that enter into the subtracter 616; and (c) the divider 617 and scaler 618.

The output of the log conversion amplifier 601 is connected to multiplier #1, 602, which multiplies the log of amplitude from 601 by the time of arrival from terminal 603. The output of 602 is fed to integrator #1, 609, which sums the product of log video and times of arrival. The output of 609 is one additive input of the adder/subtracter 615.

The time of arrival data at terminal 603 is also connected to both inputs of multiplier #2, 604, which squares the time of arrival of each pulse pair. The output of 604 is connected to one input terminal of multiplier #3, 605 and the time of arrival from terminal 603 is connected a second input of multiplier #3. Multiplier #3, 605, computes the cube of the time of arrival of each pulse pair. The output of multiplier #3 is fed to integrator #5, 611, which sums the cubes of times of arrival. The output of 611 is another one of the additive inputs of the adder/subtracter 615.

The time of arrival data at terminal 603 is connected also to integrator #3, 606, which sums the time of arrival of the pulse pairs and sends its output to one input of divider #1, 608. The data from terminal 603 also goes to integrator #6, 607, which records the number of video pulse pairs. Its output is connected to another input of divider #1, 608. Divider #1 develops the average time of arrival of the samples or pulse pairs.

Integrator #2, 603 at the top of FIG. 6, receives its input signal from the output of the log conversion amplifier 601 and it sums the log video amplitude pulses. The output of 603 is connected to one input of a multiplier #4, 612. The other input of multiplier #4 is the average time of arrival, which it receives from the output of 608. Multiplier #4 develops the product of sums of the log video and average time of arrival. Its output is connected to a subtractive input of the adder/subtracter 615.

The output of multiplier No. 2, 604, is connected also to an input terminal of integrator #4, 610, which sums the squares of times of arrival. Its output is connected to one input of a multiplier #5, 613. A second input of multiplier #5 is received from the output of divider #1, 608. Multiplier #5 develops the product of the sum of the times of arrivals squared and the average time of arrival. The output of multiplier #5 is connected to another subtractive input of the adder/subtracter 615.

The adder/subtracter 615 produces an output which is connected to the numerator input terminal of a divider 617.

Another use of the output of integrator #4, 610, is to serve as an input signal for a subtracter 616. Another use of the average time output of the divider 608 is to serve as one input of a multiplier #6, 614. Another input of 614 is an output signal from integrator #3, 606. Multiplier #6 develops a product of the sum of times of arrival and average time of arrival at its output terminal. The output of 614 is connected to the subtractive input terminal of the subtracter 616. Subtracter 616 subtracts the output of 614 from the output of 610 to produce its own output signal, which is connected to the denominator input terminal of the divider 617.

The divider 617 develops the ratio of the outputs of 615 and 616 and sends its output quotient to the input of a scaler 618. The scaler 618 divides the output of 617 by 2 and outputs its signal at a terminal 625. The output signal at terminal 625 represents a best estimate $T_c$ of the center time $t_c$.

A digital embodiment of the invention is made by applying elements of the prior art to the foregoing disclosure. In a digital embodiment the integrators of FIG. 6 are replaced by accumulators.

Although elevation guidance of aircraft has been described in detail, it is within the scope of this invention to apply the same techniques to beams sweeping in other directions, such as azimuthal guidance beams. Many other variations of the invention are possible also within the scope of the claims.

I claim:

1. A guidance system of the type wherein a ground station transmits an antenna beam to sweep vertically across an aircraft, said beam having encoded elevation data that varies in a predetermined manner in accordance with the elevation of the beam, and wherein the aircraft utilizes the amplitude of the received sweeping beam signal and the encoded elevation data in determining the location of the aircraft from the station, comprising:

receiving means for receiving said signal, whose amplitude as a function of time is affected by the radiation pattern of the beam, including means for receiving said encoded elevation data;

data processing means for automatically processing the amplitude data of said signal, including logarithmic conversion means for converting said signal to data which are logarithms of the amplitudes of said signal, and means for computing parameters of a Gaussian distribution curve that most nearly fits said data by a least squares error criterion, and means for blocking effects of amplitude data upon said parameters when said elevation data indicate that the beam is below said predetermined elevation; and means for producing an output representing the value of the median of said Gaussian distribution, whereby an estimate is available of the time of receiving the true peak of said beam signal, and comprising means for utilizing said encoded elevation data and said estimate of the time of receiving the peak of said beam to determine the elevation of the beam.

2. A guidance system of the type wherein a ground station transmits an antenna beam to sweep across an aircraft that utilizes the amplitude of the received sweeping beam signal in determination of the location of the aircraft from the station, comprising:

receiving means for receiving said signal, whose amplitude as a function of time is affected by the radiation pattern of the beam;

data processing means for automatically processing the amplitude data of said signal to compute parameters of a predetermined shape of curve that most nearly fits said data;

means for producing an output representing the value of the median of said curve, whereby an estimate is available of the time of receiving the peak of said beam signal; and wherein said receiving system comprises means for receiving elevation data encoded in said signal from the ground station, varying in a predetermined manner in accordance with the elevation of the beam, and wherein said output means comprises means for utilizing said encoded data and the estimate of the time of receiving the peak of said beam to determine the elevation of the beam.

3. A guidance system of the type wherein a ground station transmits an antenna beam to sweep across an aircraft that utilizes the amplitude of the received sweeping beam signal in determination of the location of the aircraft from the station, comprising:

receiving means for receiving said signal, whose amplitude as a function of time is affected by the radiation pattern of the beam;

data processing means for automatically processing the amplitude data of said signal to compute parameters of a predetermined shape of curve that most nearly fits said data;

means for producing an output representing the value of the median of said curve, whereby an estimate is available of the time of receiving the peak of said beam signal;

wherein said data processing means comprises means for processing amplitude data of a beam that sweeps in elevation, and further comprising means for blocking effects upon said median, of data when the beam is below a predetermined elevation.

4. A guidance system of the type wherein a ground station transmits an antenna beam to sweep across an aircraft that utilizes the amplitude of the received sweeping beam signal in determination of the location of the aircraft from the station, comprising:

receiving means for receiving said signal, whose amplitude as a function of time is affected by the radiation pattern of the beam;

data processing means for automatically processing the amplitude data of said signal to compute parameters of a Gaussian distribution curve that most nearly fits said data;

means for producing an output representing the value of the median of said Gaussian distribution, whereby an estimate is available of the time of receiving the peak of said beam signal;

wherein said data processing means comprises logarithmic conversion means for converting said signal to data which is a logarithm of the amplitudes of said signal and which comprises means for computing parameters of a Gaussian distribution curve that most nearly fits said data by a least squares error criterion; and wherein said data processing means comprises means for processing amplitude data of a beam that sweeps in elevation, and further comprising means for preventing data from affecting said median when the beam is below a predetermined elevation.

5. A guidance system as in claim 4 and wherein said receiving means comprises means for receiving elevation data encoded in said signal from the ground station, varying in a predetermined manner in accordance with the elevation of the beam, and wherein said output means comprises means for utilizing said encoded elevation data and the estimate of the time of receiving the peak of said beam to determine the elevation of the beam.

6. A guidance system as in claim 5 and wherein said means for preventing data from affecting said median when the beam is below a predetermined elevation comprises means for disregarding said amplitude data for times during which said elevation data indicate that the beam is below said predetermined elevation.

* * * * *